(12) United States Patent
Hu et al.

(10) Patent No.: US 11,015,095 B2
(45) Date of Patent: May 25, 2021

(54) PHOTO-CURABLE ADHESIVE COMPOSITION, ITS PREPARATION AND USE THEREOF

(71) Applicants: HENKEL AG & CO. KGAA, Duesseldorf (DE); HENKEL IP & HOLDING GMBH, Duesseldorf (DE)

(72) Inventors: Chao Hu, Shanghai (CN); Jiangbo Ouyang, Wallingford, CT (US); Junwei Yang, Shanghai (DE)

(73) Assignees: HENKEL AG & CO. KGAA, Duesseldorf (DE); HENKEL IP & HOLDING GMBH, Duesseldorf (DE)

( * ) Notice: Subject to any disclaimer, the term of this patent is extended or adjusted under 35 U.S.C. 154(b) by 70 days.

(21) Appl. No.: 15/819,774

(22) Filed: Nov. 21, 2017

(65) Prior Publication Data

US 2018/0072929 A1 Mar. 15, 2018

Related U.S. Application Data

(63) Continuation of application No. PCT/CN2015/079799, filed on May 26, 2015.

(51) Int. Cl.
| | | |
|---|---|---|
| *C09J 175/16* | (2006.01) | |
| *C08G 18/75* | (2006.01) | |
| *C08G 18/28* | (2006.01) | |
| *C08G 18/67* | (2006.01) | |
| *C08G 18/10* | (2006.01) | |
| *C09J 4/06* | (2006.01) | |
| *C08L 75/16* | (2006.01) | |
| *C08G 18/81* | (2006.01) | |

(52) U.S. Cl.
CPC ............ *C09J 175/16* (2013.01); *C08G 18/10* (2013.01); *C08G 18/282* (2013.01); *C08G 18/2825* (2013.01); *C08G 18/672* (2013.01); *C08G 18/755* (2013.01); *C08G 18/8175* (2013.01); *C08L 75/16* (2013.01); *C09J 4/06* (2013.01); *C09K 2323/00* (2020.08); *C09K 2323/05* (2020.08); *C09K 2323/057* (2020.08)

(58) Field of Classification Search
CPC .................. C08G 18/282; C08G 18/8175; C08G 18/672; C08G 18/755; C08G 18/10; C09J 175/16; C09J 4/06; C08L 75/16; Y10T 428/10; Y10T 428/1059; Y10T 428/1077; C09K 2323/00; C09K 2323/05; C09K 2323/057
USPC .......... 428/1.1, 1.5, 1.54; 118/642; 427/164, 427/508; 156/275.7
See application file for complete search history.

(56) References Cited

U.S. PATENT DOCUMENTS

| | | | | |
|---|---|---|---|---|
| 5,352,712 A | * | 10/1994 | Shustack | ............... C03C 25/106 385/123 |
| 2005/0119438 A1 | | 6/2005 | Leon et al. | |
| 2012/0177912 A1 | | 7/2012 | Kim et al. | |
| 2012/0270038 A1 | | 10/2012 | Kim et al. | |
| 2013/0284360 A1 | | 10/2013 | Held et al. | |
| 2014/0142210 A1 | * | 5/2014 | Zhang | ................... C09J 175/14 522/8 |

FOREIGN PATENT DOCUMENTS

| | | |
|---|---|---|
| CN | 103930511 A | 7/2014 |
| JP | 4-183770 A | 6/1992 |
| TW | 201305301 A | 2/2013 |
| WO | 2009086491 A1 | 7/2009 |
| WO | 2009086492 A1 | 7/2009 |
| WO | 2014093014 A1 | 6/2014 |

* cited by examiner

*Primary Examiner* — Ruiyun Zhang
(74) *Attorney, Agent, or Firm* — Steven C. Bauman

(57) ABSTRACT

The present invention relates to a photo-curable adhesive composition comprising a (meth)acrylate capped aliphatic polyurethane having an average number of ethylenically unsaturated groups less than 1, a mono-functional (meth) acrylate monomer or oligomer and a photoinitiator. The adhesive composition can be used in a method of bonding a substrate to a liquid crystal display. The adhesive composition according to the present invention has improved side curing depth.

11 Claims, No Drawings

PHOTO-CURABLE ADHESIVE COMPOSITION, ITS PREPARATION AND USE THEREOF

FIELD OF THE INVENTION

The present invention relates to a photo-curable adhesive composition, its preparation and use thereof.

BACKGROUND OF THE INVENTION

Liquid optically clear adhesive (LOCA) is a liquid-based bonding technology used in touch panels and display devices to bind the cover lens, plastic or other optical materials to the main sensor unit or to each other. Adhesives are used to improve the optical characteristics of the device as well as improve other attributes.

One trend in display devices is that the bezels are narrower, which requires a new type of LOCA having a higher thixotropic index, while maintaining other optical and mechanical properties as well as reworkability. An appropriate thixotropic index can be achieved by adding rheology modifier, such as a fumed silica. Crosslinking density influences the performance of an adhesive in many ways, such as modulus after curing, bonding strength, elongation at break and transparency. The crosslinking density can be adjusted by various ways such as using monomers, chain transfer agents, plasticizers and especially in urethane acrylates by controlling the number of ethylenically unsaturated groups of urethane acrylate. Urethane acrylate having higher content of ethylenically unsaturated groups has higher crosslinking density. Typically, monomers are used to increase the crosslinking density, while chain transfer agents and plasticizers are used to decrease the crosslinking density. However, commonly used chain transfer agents like mercaptans or halogenated hydrocarbons have negative effects. Mercaptans tend to turn yellow during UV curing, and furthermore they have unfavourable odour. Halogenated hydrocarbons are toxic, and they also tend to turn yellow during UV curing. The plasticizers have disadvantages that they are mobile small molecules and tend to bleed from the cured adhesive, and therefore, cause reduction of adhesion strength.

In the prior art urethane acrylates having plurality of ethylenically unsaturated groups have been used, and in order to control modulus, plasticizers and chain transfer agent have been used.

Therefore, there is still a need for a new liquid optical clear adhesive having good transparency, reworkability and mechanical strength.

SUMMARY OF THE INVENTION

As one object, the invention provides a photo-curable adhesive composition comprising
a) a (meth)acrylate capped aliphatic polyurethane having an average number of ethylenically unsaturated groups less than 1;
b) a mono-functional (meth)acrylate monomer or oligomer; and
c) a photoinitiator.

As another object, the invention provides a method of bonding a substrate to a liquid crystal display comprising steps of:
i) applying the photo-curable adhesive composition onto the surface of substrate or liquid crystal display or both;
ii) contacting the surfaces of substrate and liquid crystal display; and
iii) UV curing the adhesive composition.

As a further object, the invention provides a use of the photo-curable adhesive composition in binding substrates of display panels and touch panels.

As further another object, the invention provides a display device or touch panel comprises the cured adhesive composition in a form of optically clear laminates.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

The present invention relates to a photo-curable adhesive composition comprising a) a (meth)acrylate capped aliphatic polyurethane having an average number of ethylenically unsaturated groups less than 1; b) a mono-functional (meth)acrylate monomer or oligomer; and c) a photoinitiator.

By the term "mono-functional" is meant herein monomer or oligomer having only one ethylenic linkage in each molecular chain.

The photo-curable adhesive composition according to the present invention comprises a (meth)acrylate capped aliphatic polyurethane having an average number of ethylenically unsaturated groups less than 1. The (meth)acrylate capped aliphatic polyurethane comprises structure I and structure II or structure III, or comprises structures I, II and III

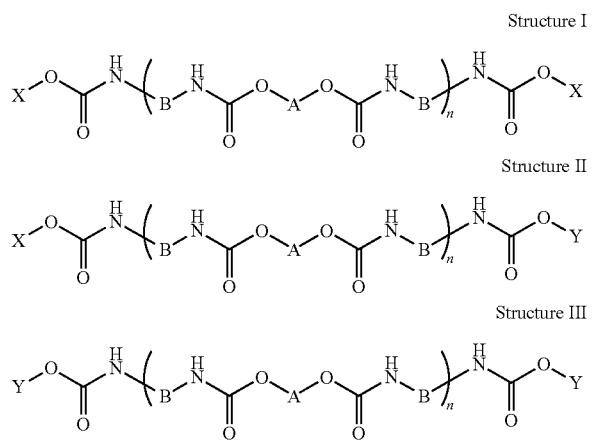

Structure I

Structure II

Structure III

X denotes C1-C20 alkyl, cycloalkyl, alkenyl, acryl or aralkyl terminated with (meth)acrylate group;
Y denotes C1-C20 alkyl, cycloalkyl, alkenyl, acyl, aralkyl group;
A denotes polyether, polyester, polycarbonate or polyhydrocarbon;
B denotes C1-C10 alkyl, cycloalkyl, alkenyl, acyl or alkyl groups; and
n is integer from 1 to 500.

Preference of substituent A depends on the application. For example, if high thixotropic index desired/required, polyether is preferred, because it is more compatible with rheology modifier. On the other hand, if low dielectric constant is desired polyhydrocarbon is preferred.

The term "thixotropic index" used herein means the ratio of viscosity measured at shearing rate of 1 Hz and 10 Hz respectively according to the standard ASTM D2196-10.

The (meth)acrylate capped aliphatic polyurethane according to the present invention has the number average molecular weight from 1000 to 100,000, preferably from 10,000 to 30,000 and more preferably from 15,000 to 25,000. (Meth) acrylate capped aliphatic polyurethane having molecular weight lower than 1000 tends to have negative effect on mechanical properties such as low extension ratio and low breakage strength. On the other hand, when (meth)acrylate capped aliphatic polyurethane has molecular weight over 100,000, the composition will have very high viscosity, which leads to difficulties to formulate and mix homogeneous compositions. The molecular weight is measured by using gel permeation chromatography (GPC).

The (meth)acrylate capped aliphatic polyurethane according to the present invention has average functionality from 0.01 to 0.99, preferably from 0.1 to 0.9, and more preferably from 0.1 to 0.5. By the term "average functionality" is meant herein the average number of (meth)acrylate groups in (meth)acrylate capped aliphatic polyurethane. Average functionality more than 1 will lead to over-crosslinking, which on the other hand lead to very high modulus of the cured composition. Chain transfer agent and/or plasticizer are commonly used to reduce the cross-linking density. However, both chain transfer agent and plasticizer have a negative effect on overall performance of the composition. Commonly used chain transfer agent is sulfur-contained compounds, such as mercaptans or halogenated hydrocarbons. Sulfur-contained compounds tend to turn yellow during aging, and in addition they have unfavourable odour. Halogenated hydrocarbons are toxic, and have potential tendency to turn yellow during aging. Plasticizer is on the other hand small molecule and stays mobile after cure of the adhesives, which leads to bleeding, and further reduce adhesion.

By choosing the average functionality of (meth)acrylate group from 0.01 to 0.99, the density of cross-linking can be controlled, and therefore to obtain an optical clear adhesive. In addition, having the average functionality of (meth) acrylate group from 0.01 to 0.99 allows the formulation without plasticizer and chain transfer agent.

The functionality of (meth)acrylate capped aliphatic polyurethane can be adjusted by two methods. By the term "functionality" is meant herein the number of (meth)acrylate groups in each (meth)acrylate capped aliphatic polyurethane.

The first method is to synthesize directly the (meth) acrylate capped aliphatic polyurethane having an average functionality from 0.01 to 0.99. For example, polypropylene glycol and isophorone diisocyanate are mixed with adding dibutyltin dilaurate as a catalyst, while the ratio of isocyanate and hydroxyl is 1.8:1. Subsequently, n-butanol is added as a capping agent in amount that the ratio of hydroxyl and unreacted isocyanate is 0.85:1. Followed by heating for hours. Subsequently, hydroxylethyl acrylate is added as a capping agent in amount that the ratio of hydroxyl and unreacted isocyanate is 1:1. Followed by heating for hours. Synthesised (meth)acrylate capped aliphatic polyurethane has an average functionality of 0.3.

The second method includes two steps. Firstly (meth) acrylate capped aliphatic polyurethane having functionality of 0, 1 and 2 respectively is synthesised. Secondly, (meth) acrylate capped aliphatic polyurethane having functionality of 0 and 1 or 0 and 2 or 0, 1 and 2 (based on weight percentage) is mixed to obtain (meth)acrylate capped aliphatic polyurethane having average functionality from 0.01 to 0.99. In order to obtain (meth)acrylate capped aliphatic polyurethane having functionality of 0, no acrylate functional capping agent is added. In order to obtain (meth) acrylate capped aliphatic polyurethane having functionality of 2, only acrylate functional capping agent is added. In order to obtain (meth)acrylate capped aliphatic polyurethane having functionality of 1, the ratio of non-acrylate functional capping agent and acrylate functional capping agent is 1:2.

Alternatively, (meth)acrylate capped aliphatic polyurethane having average functionality from 0.01 to 0.99 can be synthetized from the (meth)acrylate capped aliphatic polyurethanes having functionality other than 0, 1, 2. (Meth) acrylate capped aliphatic polyurethanes having functionality of <1 and >1 respectively are synthesised. Subsequently, these (meth)acrylate capped aliphatic polyurethanes (based on weight percentage) are mixed to obtain (meth)acrylate capped aliphatic polyurethane having average functionality from 0.01 to 0.99.

The photo-curable adhesive composition according to the present invention comprises a (meth)acrylate capped aliphatic polyurethane from 5% to 95% by weight of the total weight of the composition, preferably from 25% to 90% and more preferably from 30% to 65%. When the content of (meth)acrylate capped aliphatic polyurethane is less than 5%, the cured adhesive would be too hard and would not be tacky and flexible. Furthermore, the cured adhesive would have low extension ratio and low breakage strength. In another aspect, when the content of (meth)acrylate capped aliphatic polyurethane is more than 95%, the mechanical properties could not reach to the required level (composition is either too hard or too soft, depending on the structure of (meth)acrylate capped aliphatic polyurethane.

The photo-curable adhesive composition according to the present invention comprises a mono-functional (meth)acrylate monomer or oligomer. Preferably, (meth)acrylate monomer is selected from the group consisting of methyl (meth) acrylate, ethyl (meth)acrylate, butyl (meth)acrylate, 2-(2-ethoxyethoxy) ethyl acrylate, tetrahydrofurfuryl (meth) acrylate, lauryl actylate, isooctyl acrylate, n-octyl acrylate, isodecyl acrylate, n-decyl acrylate, isobornyl acrylate, 2-phenoxythyl acrylate, 2-hydroxyethyl (meth)acrylate, 2-hydroxypropyl (meth)acrylate, 2(or 4)-hydroxybutyl (meth)acrylate, caprolactone acrylate, morpholine (meth) acrylate and mixtures thereof.

More preferably, mono-functional (meth)acrylate monomer is selected from the group consisting of lauryl acrylate, isooctyl acrylate, n-octyl acrylate, isodecyl acrylate, n-decyl acrylate, isobornyl acrylate, 2-hydroxyethyl (meth)acrylate, 2-hydroxypropyl (meth)acrylate, 2-hydroxybutyl (meth) acrylate, 4-hydroxybutyl (meth)acrylate, and mixtures thereof. These (meth)acrylate monomers are preferred because they are compatible with suitable urethane acrylates.

Suitable commercially available mono-functional (meth) acrylate monomers for use in the present invention are LA 1214 (lauryl acrylate), LA 12 (lauryl acrylate), BEA 1822 (behenyl acrylate), HexA (n-hexyl acrylate), 4-HBA (4-hydroxybutyl acrylate), 2-PHA HG (2-propylheptyl acrylate high grade), all supplied by BASF.

The photo-curable adhesive composition according to the present invention comprises a mono-functional (meth)acrylate monomer or oligomer from 5% to 95% by weight of the total weight of the composition, preferably from 5% to 70% and more preferably from 10% to 35%. When the content of a mono-functional (meth)acrylate monomer or oligomer is less than 5%, the solubility of additives into the composition tends to be very low. Specific additives are needed to adjust some properties of the composition, however, those additives will separate from the composition bulk, and therefore, do not function as they should. In another aspect, when the content of a mono-functional (meth)acrylate monomer or oligomer is more than 95%, the mechanical properties can not reach to the required level (composition is either too hard or too soft, depending on the structure of (meth)acrylate capped aliphatic polyurethane. In addition, the cured adhesive would be too hard and would not be tacky and flexible. Furthermore, the cured adhesive would have low extension ratio and low breakage strength.

The photo-curable adhesive composition according to the present invention comprises a photoinitiator. By the term "photoinitiator" is meant herein a chemical compound that decomposes into free radicals when exposed to UV light, and subsequently initiates the UV-curing reaction.

Suitable photoinitiator for use in the present invention is preferably selected from the group consisting of 1-hydroxy cyclohexyl phenyl ketone, 2-methyl-1-[4-(methylthio)phenyl]-2-morpholino propan-1-one, 2-benzyl-1-N,N-dimethylamino-1-(4-morpholinophenyl)-1-butanone, combination of 1-hydroxy cyclohexyl phenyl ketone and benzophenone, 2,2-dimethoxy-2-phenyl acetophenone, combination of bis (2,6-dimethoxybenzoyl-2,4,6-trimethylpentyl) phosphine oxide and 2-hydroxyl-2-methyl-1-phenyl-propan-1-one, bis (2,4,6-trimethyl benzoyl) phenyl phosphine oxide, 2-hydroxy-2-methyl-1-phenyl-1-propane, combination of 2,4,6-trimethylbenzoyl diphenyl phosphine oxide and 2-hydroxy-2-methyl-1-phenyl-propan-1-one, 2,4,6-trimethylbenzoyldiphenylphosphine oxide and mixtures thereof.

More preferably, the photoinitiator is selected from the group consisting of 1-hydroxy cyclohexyl phenyl ketone, 2,4,6-trimethylbenzoyldiphenylphosphine oxide, bis(2,4,6-trimethyl benzoyl) phenyl phosphine oxide and mixtures thereof.

Suitable commercially available photoinitiators for use in the present invention are Irgacure® 184 (2-methyl-1[4-(methylthio)phenyl]-2-morpholinopropane-1-one, Irgacure® 1173 (2-hydroxy-2-methyl-1-phenyl propan-1-one), Irgacure® 2959, (2-hydroxy-1-[4-(2-hydroxyethoxy)phenyl]-2-methyl-1propanone), Darocur® TPO (diphenyl(2,4,6-trimethylbenzoyl)-phosphine oxide), Irgacure 819 (phosphine oxide, phenyl bis(2,4,6-trimethyl benzoyl)), Irgacure® 651 (methylbenzoylformate (Darocure MBF), α,α-dimethoxy-α-phenylacetophenone), Irgacure® 2020 (a mixed initiator (of Irgacure® 819 and Irgacure® 1173), all are supplied by BASF.

The photo-curable adhesive composition according to the present invention comprises photoinitiator from 0.05% to 5% by weight of the total weight of the composition, preferably from 0.05% to 2.5% and more preferably from 0.1% to 1%. When the content photoinitiator is less than 0.05% by weight of the total weight of the composition, the polymerization reaction is not complete, which leads to problems with mechanical and optical properties. However, when the content is higher than 5%, composition contains an excess of photoinitiator, and unreacted photoinitiator have negative effect on the composition, mainly aging and turning composition yellow.

Optionally, the photo-curable adhesive composition may further comprise other additives such as rheology modifier, light stabilizer etc.

Suitable rheology modifiers include inorganic rheology modifiers such as clay and silica and organic rheology modifiers such as cellulose.

When present, the photo-curable adhesive composition comprises rheology modifier from 1% to 10% by weight of the total weight of the composition, preferably from to 0.5% to 8%.

Suitable light stabilizer is anti-oxidation agent and/or UV absorber.

When present, the photo-curable adhesive composition comprises light stabilizer from 0.1% to 3%, preferably from 0.1% to 2%.

The photo-curable adhesive according to the present invention is free of plasticizer or chain transfer agent because both of them have negative impact on mechanical and optical properties. However, in some occasions composition according to the present invention may comprise plasticizer or chain transfer agent, with the provision that neither of them have negative impact on desired properties.

Suitable chain transfer agent for use in the present invention is sulfur-contained compounds such as mercaptans or halogenated hydrocarbons.

Suitable plasticizer for use in the present invention is any compound or combination of compounds known to have plasticizing property.

Suitable commercially available plasticizers for use in the present invention are Cyroflex SR660 (dibutoxyethoxyethyl formal) from Sartomer and TXIB (2,2,4-Trimethyl-1,3-pentanediol diisobutyrate) from Eastman.

When present, the photo-curable adhesive composition according to the present invention may comprise a plasticizer less than 5% by weight of the total weight of the composition, preferably less than 3%, and more preferably less than 1%.

When present, the photo-curable adhesive composition according to the present invention may comprise a chain transfer agent less than 5% by weight of the total weight of the composition, preferably less than 2% and more preferably less than 1%.

The photo-curable adhesive composition according to the present invention can be prepared by mixing all components together to gain homogenous mixture. The mixing is done at room temperature. The mixing device can be for example orbital-motion (planetary) mixer, or compulsory mixer.

The obtained mixture has a thixotropic Index greater than 3, preferably greater than 5, and more preferably greater than 7, and the thixotropic index is measured according to the standard ASTM D2196-10. When the thixotropic index is less than 3, it means that the viscosity under shear or stirring will not decrease much and when the shear force or stirring stops, the viscosity will not increase much. Therefore, it will be very difficult to apply the adhesive composition having thixotropic index is less than 3 onto narrow bezels of touch panels or LCD screen or other similar devices. This is because the adhesive composition will flow out of the area of narrow bezels after application.

The photo-curable composition according to the present invention is cured under UV light to obtain the cured adhesive.

Light source can be mercury lamp or LED light, such as Henkel LED Flood Array wavelength 365 nm, 405 nm, Indigo™.

The light dosage is generally about 3000 mJ. Different formulation requires different UV dosage. UV dosage according to the present invention is in the range of from 800 to 20000 mJ.

After curing, the adhesive composition has a modulus greater than 10000 and less than 150000, and preferably higher than 40000, wherein modulus is measured according to the test method described in the description below. When the modulus is less than 10000, strength of the adhesive is very low, which does not meet the application requirements. On the other hand, when the modulus is higher than 150000, hardness of the adhesive is too high, which creates problems in reworkability of the composition.

Elastic modulus measurement is well known in the art. Elastic modulus is measured by using photorheometry measurement, for example by using Physica MCR301 Photorheometer from Anton Paar GmbH, Germany. The photorheometer has a pair of parallel plates (with an initial gap of 1.00 mm), and the bottom plate is made of quartz. The adhesive composition according to the present invention is sandwiched between the plates. UV light (with UVA intensity of 93 mW/cm$^2$) is produced by a high pressure mercury arc (HPMA) lamp and directed through the bottom plate to cure the adhesive sandwiched between the parallel plates. The adhesive is tested under an oscillation mode (with a fixed angular frequency of 30 rad/s and 0.5% strain). The modulus is recorded with UV curing time. A zero fixed normal force (Fn) is used so that the gap is automatically reduced to accommodate sample shrinkage during cure.

After curing the adhesive composition has a side curing depth greater than 2.0 cm, and preferably greater than 2.5 cm. The side curing depth is measured according to the side curing depth test method described below. As a comparison, existing photo-curing adhesive composition normally has a side curing depth of no more than 1.0 cm. Greater side curing depth ensures the shadow area of substrates (display device or touch panel) is well adhered and avoid any potential product flaws.

The side curing depth is measured according to the side curing depth test method described below.

This test method is used to identify the curing depth of a liquid optically clear adhesive in the shadow area that has been cured by side cure equipment LOCTITE LED line Array 365 nm. The method comprises steps of:
1) prepare glass substrates in size of 25.4 mm*101.6 mm*6 mm with black ink;
2) apply the adhesive composition (thickness of about 1 μm) in either one of the two glass substrates;
3) assemble two glass substrates to ensure that they are completely overlapping and the adhesive is sandwiched between the glass substrates;
4) cure the adhesive composition by using LED light such as LOCTITE LED line Array 365 nm, which is a linear light;
5) separate the cured sample by hand and use vernier calipers to measure the curing width;
6) three parallel points in the middle area are to be tested in order to calculate the average value.

The photo-curable adhesive composition according to the present invention is used in binding substrates of display panels and touch panels.

In one preferred embodiment, the method of bonding a substrate to a liquid crystal display comprises steps of:
 i) applying the photo-curable adhesive composition according to the present invention onto the surface of substrate or liquid crystal display or both;
 ii) contacting the surfaces of substrate and liquid crystal display; and
 iii) UV curing the adhesive composition.

Preferably the photo-curable adhesive composition is applied by slit coating or stencil printing in step i.

In one embodiment, the present invention relates to a display device or touch panel comprising the cured adhesive composition according to the present invention in a form of optically clear laminates.

EXAMPLES

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples are considered as exemplary only, with a true scope and spirit of the invention being indicated by the claims.

Example 1

Synthesis of (Meth)Acrylate Capped Aliphatic Polyurethane Having Functionality of 0.3

At ambient temperature, 10 g polypropylene glycol (Voranol2120 from DOW) was added into a glass reactor having a thermoregulator and a mechanical stirrer together with 500 ppm dibutyltin dilaurate catalyst (DBTDL (CAS 77-58-7) from Sigma-Aldrich), and stirred. Subsequently, isophorone diisocyanate (CAS 4098-71-9 from Sigma-Aldrich) was added, providing the ratio of isocyanate and hydroxyl 1.8:1. The reaction mixture was stirred for 2 hours at 75° C.

n-butanol capping agent (CAS 71-36-3 from Sinopharm chemical reagent Co. Ltd.) was added in amount that the ratio of hydroxyl and unreacted isocyanate is 0.85:1. The reaction mixture is stirred for 2 hours at 75° C.

2-hydroxylethyl acrylate (2-HEA (CAS 818-61-1) from Sigma-Aldrich) was added as second capping agent in amount that the ratio of hydroxyl and unreacted isocyanate is 1:1. The reaction mixture is stirred for 2 hours at 75° C.

The reaction were monitored with real time FTIR. And final molecular weight were measured by using GPC.

Example 2

Preparation of the Photo-Curable Adhesive Composition
74.35 g (meth)acrylate capped aliphatic polyurethane (functionality=0.3) prepared in example 1
16.52 g lauryl acrylate (LA12 from BASF)
0.2 g photoinitiator (Darocur TPO from Ciba)
8.93 g rheology modifier-fumed silica (Aerosil 300 from Evonik)
were mixed together in Speedmixer™ (FlackTek Inc.), till homogeneous mixture were achieved. For the larger scale, planetary mixer or compulsory mixer should be used instead.

TI (thixotropic index) before curing, modulus after curing and side curing depth of photo-curable adhesive composition of example 2 were measured according to the test method described above.
TI 7.2
Modulus after curing 50000 Pa
Side curing depth>2.3 cm Example 3

Synthesis of (Meth)Acrylate Capped Aliphatic Polyurethane Having Functionality of 1.0
(50 g) Polypropylene glycol (Voranol2120 from Dow Chemicals, Mw=2000) was added together with 500 parts per million dibutyltin dilaurate catalyst (DBTDL (CAS 77-58-7) from Sigma-Aldrich), to a glass reactor equipped with a thermoregulator and a mechanical stirrer, at ambient temperature. Subsequently, isophorone diisocyanate (CAS 4098-71-9 from Sigma-Aldrich) was added, providing the ratio of isocyanate and hydroxyl 1.8:1. The reaction mixture was stirred at 75° C. for two hours.

Subsequently, n-butanol capping agent (CAS 71-36-3 from Sinopharm chemical reagent Co. Ltd.) was added providing the ratio of hydroxyl and unreacted isocyanate 0.5:1, and to block partially isocyanate end-group. The reaction mixture was stirred for two hours at 75° C. to complete the capping reaction.

2-hydroxylethyl acrylate (acrylate functional capping agent) (2-HEA (CAS 818-61-1) from Sigma-Aldrich), was added to provide the ratio of hydroxyl and unreacted isocyanate 1:1. The reaction mixture was stirred for two hours at 75° C. to complete the capping reaction. Subsequently, the reaction mixture was cooled down to room temperature, and (meth)acrylate capped aliphatic polyurethane with a (meth)acrylate functionality of 1 was obtained.

The reaction were monitored with real time FTIR. And final molecular weight were measured by using GPC.

Example 4

Synthesis of (Meth)Acrylate Capped Aliphatic Polyurethane Having Functionality of 0
(50 g) Polypropylene glycol (Voranol2120 from Dow Chemicals, Mw=2000) was added together with 500 parts per million dibutyltin dilaurate catalyst (DBTDL (CAS 77-58-7) from Sigma-Aldrich), to a glass reactor equipped with a thermoregulator and a mechanical stirrer, at ambient temperature. Subsequently, isophorone diisocyanate (CAS 4098-71-9 from Sigma-Aldrich) was added, providing the ratio of isocyanate and hydroxyl 1.8:1. The reaction mixture was stirred at 75° C. for two hours. Subsequently, n-butanol capping agent (CAS 71-36-3 from Sinopharm chemical reagent Co. Ltd.) was added providing the ratio of hydroxyl and unreacted isocyanate 1:1, and to block partially isocyanate end-group. The reaction mixture was stirred for two hours at 75° C. to complete the capping reaction. Subsequently, the reaction mixture was cooled down to room temperature, and (meth)acrylate capped aliphatic polyurethane with a (meth)acrylate functionality of 0 was obtained. The reaction was monitored with real time FTIR. And the final molecular weight was measured by using GPC.

Example 5

Preparation of the Photo-Curable Adhesive Composition
23.05 g (meth)acrylate capped aliphatic polyurethane (functionality=1) prepared in example 3
46.10 g (meth)acrylate capped aliphatic polyurethane (functionality=0) prepared in example 4
23.05 g lauryl acrylate (LA12 from BASF)
0.2 g photoinitiator (0.1 g Darocur TPO from Ciba and 0.1 g Irgacure 184 from Ciba)
7.6 g rheology modifier-fumed silica (Aerosil 300 from Evonik) were mixed together in Speedmixer™ (Flack Tek Inc), until homogeneous mixture were achieved. For the larger scale, planetary mixer or compulsory mixer should be used instead.

TI (thixotropic index) before curing, modulus after curing and side curing depth of photo-curable adhesive composition of example 4 were measured according to the test methods described above.
TI 7.2
Modulus after curing 46000 Pa
Side curing depth >2.3 cm Comparative Example Under the same test conditions, Loctite x0011 was tested. (Meth)acrylate capped aliphatic polyurethane used in Loctite x0011 has an average number of ethylenically unsaturated groups more than 1.
TI=3
Modulus after curing 25000 Pa
Side curing depth <5 mm
Under the same test conditions, Loctite x0055 was tested. (Meth)acrylate capped aliphatic polyurethane used in Loctite x0055 has an average number of ethylenically unsaturated groups more than 1.
TI=2.7
Modulus after curing 22000 Pa
Side curing depth <5 mm As a conclusion, the photo-curable adhesive composition according to present invention has a TI value that enables carrying out in very narrow bezels of touch panel devices and after curing the strength satisfies requirement also. Furthermore, the side curing depth is enough under UV curing conditions.

The invention claimed is:
1. A photo-curable adhesive composition comprising
   a) a (meth)acrylate capped aliphatic polyurethane having an average functionality from 0.01 to 0.99 and comprising structure I and structure III, and optionally structure II,

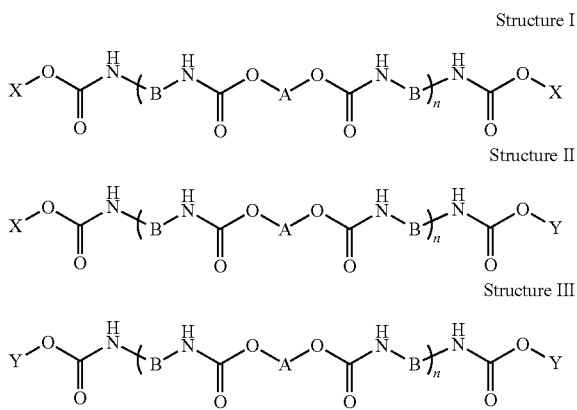

Structure I

Structure II

Structure III wherein X denotes C1-C20 alkyl, cycloalkyl, alkenyl, acryl or aralkyl terminated with (meth)acrylate;

Y denotes C1-C20 alkyl, cycloalkyl, alkenyl, acyl or aralkyl group;

A denotes polyether, polyester, polycarbonate or polyhydrocarbon; and

B denotes C1-C10 alkyl, cycloalkyl, alkenyl, acyl or alkyl groups; and n is integer from 1 to 500;

b) a (meth)acrylate monomer selected from the group consisting of methyl (meth)acrylate, ethyl (meth)acrylate, butyl (meth)acrylate, 2-(2-ethoxyethoxy) ethyl acrylate, tetrahydrofurfuryl (meth)acrylate, lauryl acrylate, isooctyl acrylate, n-octyl acrylate, isodecyl acrylate, n-decyl acrylate, isobornyl acrylate, 2-phenoxythyl acrylate, 2-hydroxyethyl (meth)acrylate, 2-hydroxypropyl (meth)acrylate, 2(or 4)-hydroxybutyl (meth)acrylate, caprolactone acrylate, morpholine (meth)acrylate, behenyl acrylate, n-hexyl acrylate, 2-propylheptyl acrylate, and mixtures thereof; and c) an initiator selected from the group consisting of a photoinitiator.

2. A photo-curable adhesive composition according to claim 1, wherein said (meth)acrylate capped aliphatic polyurethane has the number average molecular weight from 1000 to 100,000.

3. A photo-curable adhesive composition according to claim 1, wherein said (meth)acrylate capped aliphatic polyurethane has average functionality from 0.01 to 0.3.

4. A photo-curable adhesive composition according to claim 1, wherein the composition comprises a (meth)acrylate capped aliphatic polyurethane from 5% to 95% by weight of the total weight of the composition.

5. A photo-curable adhesive composition according to claim 1, wherein the composition comprises a (meth)acrylate monomer from 5% to 95% by weight of the total weight of the composition.

6. A photo-curable adhesive composition according to claim 1, wherein the composition comprises a photoinitiator from 0.05% to 5% by weight of the total weight of the composition.

7. A photo-curable adhesive according to claim 1, wherein, said composition has a thixotropic Index greater than 3, wherein the thixotropic index is measured according to the standard ASTM D2196-10.

8. A photo-cured adhesive composition according to claim 1, wherein said cured composition has a modulus greater than 10000 and less than 150000.

9. The photo-cured adhesive composition according to claim 1, wherein said cured composition has a side curing depth greater than 2.0 cm.

10. A method of bonding a substrate to a liquid crystal display comprising steps of:
    i) applying the adhesive composition according to claim 1 onto the surface of substrate or liquid crystal display or both;
    ii) contacting the surfaces of substrate and liquid crystal display; and
    iii) UV curing the adhesive composition.

11. A display device or touch panel comprising the photo-cured adhesive composition according to claim 10, wherein said cured adhesive composition is in a form of optically clear laminates.

* * * * *